United States Patent
Gielis

(10) Patent No.: US 7,298,263 B2
(45) Date of Patent: Nov. 20, 2007

(54) CONTROL AND/OR MONITORING DEVICE USING AN ELECTRONIC LABEL, A READER AND A STATE ENCODER

(75) Inventor: Michel Gielis, Muralto (CH)

(73) Assignee: Inventio AG, Hergiswill (CH)

( * ) Notice: Subject to any disclaimer, the term of this patent is extended or adjusted under 35 U.S.C. 154(b) by 568 days.

(21) Appl. No.: 10/517,736

(22) PCT Filed: Jun. 12, 2003

(86) PCT No.: PCT/EP03/07130

§ 371 (c)(1),
(2), (4) Date: Dec. 9, 2004

(87) PCT Pub. No.: WO03/107255

PCT Pub. Date: Dec. 24, 2003

(65) Prior Publication Data

US 2005/0173539 A1     Aug. 11, 2005

(30) Foreign Application Priority Data

Jun. 13, 2002 (FR) .................................. 02 07299

(51) Int. Cl.
*G08B 13/14* (2006.01)
*G08B 1/08* (2006.01)
(52) U.S. Cl. ................ 340/572.1; 340/539.11; 340/539.15; 235/435; 235/449
(58) Field of Classification Search ........... 340/572.1, 340/539.11, 572.2, 572.7, 10.1, 10.3, 539.15; 235/435, 375, 439, 449, 462.25

See application file for complete search history.

(56) References Cited

U.S. PATENT DOCUMENTS

| | | | |
|---|---|---|---|
| 4,373,163 A | 2/1983 | Vandebult | 343/842 |
| 4,821,291 A | 4/1989 | Stevens et al. | 375/37 |
| 4,879,756 A | 11/1989 | Stevens et al. | 455/39 |
| 4,937,586 A | 6/1990 | Stevens et al. | 343/702 |
| 5,028,918 A | 7/1991 | Giles et al. | 340/825.54 |
| 5,594,448 A | 1/1997 | d'Hont | 342/44 |
| 6,323,769 B1 * | 11/2001 | Dames | 340/572.2 |
| 6,617,963 B1 * | 9/2003 | Watters et al. | 340/10.41 |
| 6,980,100 B1 * | 12/2005 | Hammond | 340/505 |
| 2006/0289640 A1 * | 12/2006 | Mercure et al. | 235/435 |

FOREIGN PATENT DOCUMENTS

| | | |
|---|---|---|
| FR | 2 641 885 A1 | 7/1990 |
| NZ | 501864 | 8/2002 |
| WO | WO 011/02211 A1 | 1/2001 |

* cited by examiner

*Primary Examiner*—Toan N. Pham
(74) *Attorney, Agent, or Firm*—Klaus P. Stoffel; Wolf & Samson PC

(57) ABSTRACT

The invention concerns a control and/or monitoring device comprising pairs (P, P') of interactive members (1, 2; 1', 2') each of which includes an electronic label (1, 1') identified by a specific identification code (KID1, KID1') communicating with said label (1, 1'). For each pair (P) of interactive members, the inventive device also comprises a state encoder at least partially borne by the label (1), said encoder producing a state signal which is accessible to the reader (2) and representing a logic or analog state affecting the label (1) or a relationship between the label (1) and the reader (2).

14 Claims, 2 Drawing Sheets

CONTROL AND/OR MONITORING DEVICE USING AN ELECTRONIC LABEL, A READER AND A STATE ENCODER

PRIORITY CLAIM

This is a U.S. national stage of International Application No. PCT/EP2003/07130, filed on Jun. 12, 2003. Priority is claimed on that application and on the following application:
Country: France, Application No. 02/07299, Filed: Jun. 13, 2002.

BACKGROUND OF THE INVENTION

The invention concerns, generally, the sector of information technologies and in particular that of the identification by radio frequency, known under the Anglo-Saxon acronym RFID (for "Radio Frequency Identification").

More precisely, the invention relates to a control and/or monitoring device including at least a first pair of interactive elements made of an electronic label and of an electronic tag reader in mutual communication by means of respective radio aerials, the reader feeding the label with electrical energy in an electro-magnetic way and the label comprising a memory in which is saved an identification code which is specific to it and that it selectively transmits to the reader.

The electronic labels, still called "radio tags", "smart tags", or "smart cards", an Anglo-Saxon equivalent name to "étiquettes intelligentes", are today largely used in many automatic identification applications and in particular in theft security systems, counterfeit protection, the management of materials handling supports, the control of goods dispatching or reception, etc.

SUMMARY OF THE INVENTION

The invention, which is based on the identification of a need until now latent, aims at widening the application field of these labels.

For this purpose, the inventive device, is primarily characterised by the fact that it includes a state encoder belonging, at least to some extent, to the label and producing a status signal representative of a logical or analogical status affecting the label or a relation between the label and the reader and by the fact that the status signal is transmitted by the label to the reader or directly read by this reader.

Thanks to this fixture, the reader disposes, in form of the status signal, of an information which not only is richer than a simple identification code insofar as it is connected to the local physical environment of the label, but which additionally is, by construction, correlated with this identification code.

In an advantageous embodiment of the invention, the label is mobile compared to the reader, and the status signal is representative of a relative position of the label compared to the reader.

Under these conditions, the couple formed by the label and the reader fulfills the function that an electrical contact connected to a mechanical action fulfills, with the additional advantage that this contact disposes of an own identification thanks to the identification code of the label.

The state encoder can include at least a permanent magnet carried by one of the elements of the first pair of interactive elements and a magnetic field sensor carried by the other element of this first pair of interactive elements.

It is for example possible to provide that the state encoder permanently includes primarily a pair of magnetized tracks, distant the one from the other, carried by the label and a pair of corresponding Hall effect sensors carried by the reader. The magnetized tracks are laid out compared to the corresponding Hall effect sensors for a relative reference position of the label compared to the reader and only for this position. The status signal takes at least two different principal logical values according to whether the label is or not, in its relative reference position compared to the reader.

A maximum discrimination of the various states can be obtained by providing that the tracks of the pair of magnetized tracks have reversed polarities.

In a first possible embodiment, the label is for example physically guided, compared to the reader, between the relative reference position and a plurality of distant positions while passing by at least one of the two intermediate relative positions in each one of whose only one magnetized track is detected by a Hall effect sensor and the status signal takes at least two different secondary logical values according to whether the label is, or is not, in one of the intermediate relative positions.

The label can thus be guided in translation movement, compared to the reader, along a translation axis, the magnetized tracks being distant one from the other along this translation axis and possibly being inclined compared to this same translation axis.

In this case, the label takes for example the form of a card, the reader being at least partially flat.

In another embodiment, the label is for example guided in rotation, compared to the reader, along a rotational axis, the magnetized tracks being angularly distant one from the other by rotation around the rotational axis.

In this case, the label takes advantageously a cylindrical form, the reader itself being at least partially cylindrical.

Practically, the reader typically includes a power supply circuit and pulse shaper belonging to the state encoder and connected to the Hall effect sensors and a communication circuit connected to the aerial of this reader.

Under these conditions, the communication circuit can adopt, at least selectively, a passive state and an active state and the status signal can make the communication circuit go from its passive state to its active state at the time of the passage of the corresponding label from a distant relative position to an intermediate relative position.

The inventive device is particularly advantageous if it includes several pairs of interactive elements, each of which includes an electronic label and a tag reader. The readers of the various pairs of interactive elements are connected to a communication network and all the labels of the various pairs have different identification codes.

It is then possible to equip this device with a polling circuit connected to the communication network, communicating periodically with each reader. Each reader reads off the identification code of the associated label in so far as this reader and the associated label are in their reference relative position. Each reader transmits to the polling circuit the identification code of the associated label in so far as it was read off and the polling circuit compares each identification code which is transmitted to it to a memorized reference code and produces an anomaly signal in the event of absence of the one of the codes to be compared or of disparity of the compared codes.

BRIEF DESCRIPTION OF THE DRAWINGS

Other characteristics and advantages of the invention will clearly arise from the description which is made hereafter as an indication and by no means restrictive, by reference to the enclosed drawings, in which.

DETAILED DESCRIPTION OF THE INVENTION

Figure 1:
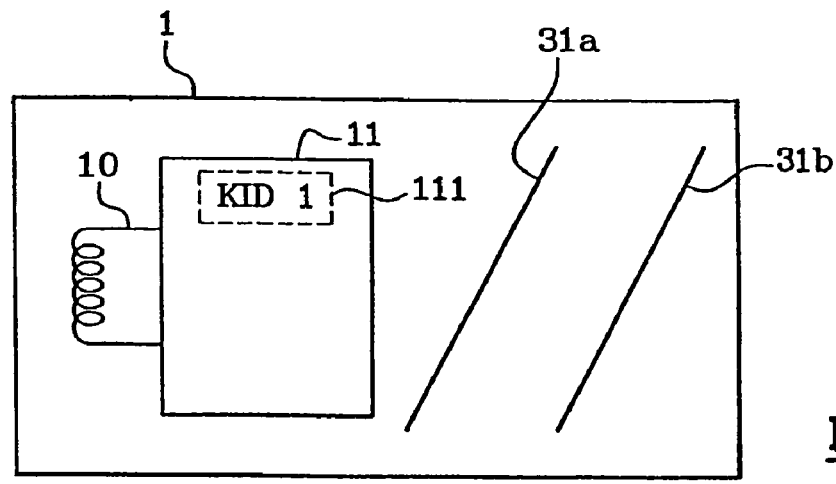
FIG. 1 is a schematic view of an electronic label modified in order to be adopted in a device according to the invention.
Figure 2:
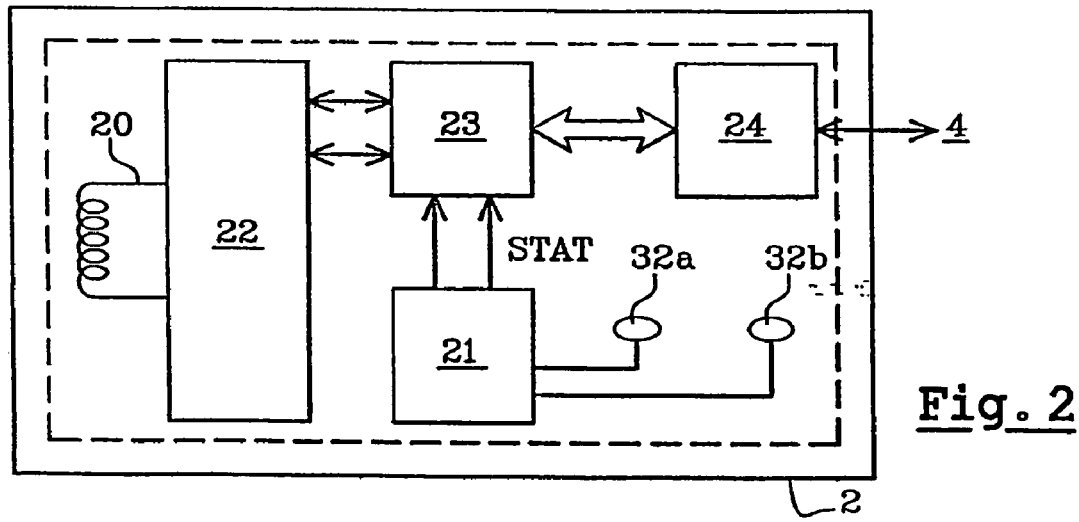
FIG. 2 is a schematic view of an electronic tag reader, modified in order to cooperate with the label of the FIG. 1 in a device according to the invention.

As indicated previously, the invention relates to a device intended to operate a control and/or monitoring.

This device includes at least a pair P of interactive elements, this pair being made of an electronic label 1 and of a reader 2 of the electronic label.

In a known manner, this label 1 and this reader 2 are in mutual communication by means of respective radio aerials, such as 10 and 20, the reader 2 feeding the label 1 with electrical energy in an electromagnetic way through these aerials 10, 20.

Label 1 comprises a multifunction circuit 11 connected to the aerial 10 and ensuring at the same time the filtering and the local distribution of electrical energy received on the aerial 10, the communication with the reader 2 and more generally the local computer resources management available to the label 1.

The multifunction circuit 11 disposes of a memory 111 in which an identification code KID1 is saved that is specific to the label 1 and which is conditionally transmitted to the reader 2 at least on request of this last.

On its side, the communication reader 2 includes a communication circuit 22 connected to the aerial 20 and which is in charge of ensuring at the same time the energy transfer towards the aerial 20 and the data transfer to or from this aerial.

The communication circuit 22 is driven by a control circuit 23, which itself can have an interactive communication with a network display unit circuit and/or network interface circuit 24.

According to an essential characteristic, the invention device includes moreover a state encoder for example made of a transducer 3 and of a power supply circuit and pulse shaper 21.

This state transducer, which belongs at least to some extent to the label 1, has as a function to produce a status signal, noted STAT, representative of a logical or analogical state specific to the pair P of interactive elements.

More precisely, the status signal STAT relates to a state affecting the label 1 or a relation between the label 1 and reader 2, and this status signal STAT is transmitted by the label 1 to the reader 2, or directly read by this reader 2.

If the STAT signal relates to a state affecting the label 1, the STAT signal can represent any physical parameter to which the label 1 is subordinated, for example a pressure, whereas the transducer 3 will be composed by a pressure transducer.

If the STAT signal relates to a relation between the label 1 and the reader 2, this relation can be composed by a relative position of these two elements, as shown in the FIGS. 1 to 5.

In this case, the label 1 is mobile compared to the reader 2, and the STAT status signal is then representative of the relative position adopted at every moment by the label 1 compared to the reader 2.

For example, the state encoder includes one or more permanent magnets, such as 31a and 31b, carried by one of the elements of the first pair P of interactive elements, in fact by the label 1 and one or more magnetic field sensors, such as 32a and 32b, carried by the other element of this first pair P of interactive elements, in fact by the reader 2.

FIGS. 1 to 3C illustrate a realisation mode in which the transducer 3 belonging to the state encoder includes two magnetised tracks, 31a and 31b, magnetised in a permanent way, distant the one from the other and carried by the label 1 and two corresponding Hall effect sensors, 32a and 32b, carried by the reader 2.

Figures 3A, 3B, 3C:
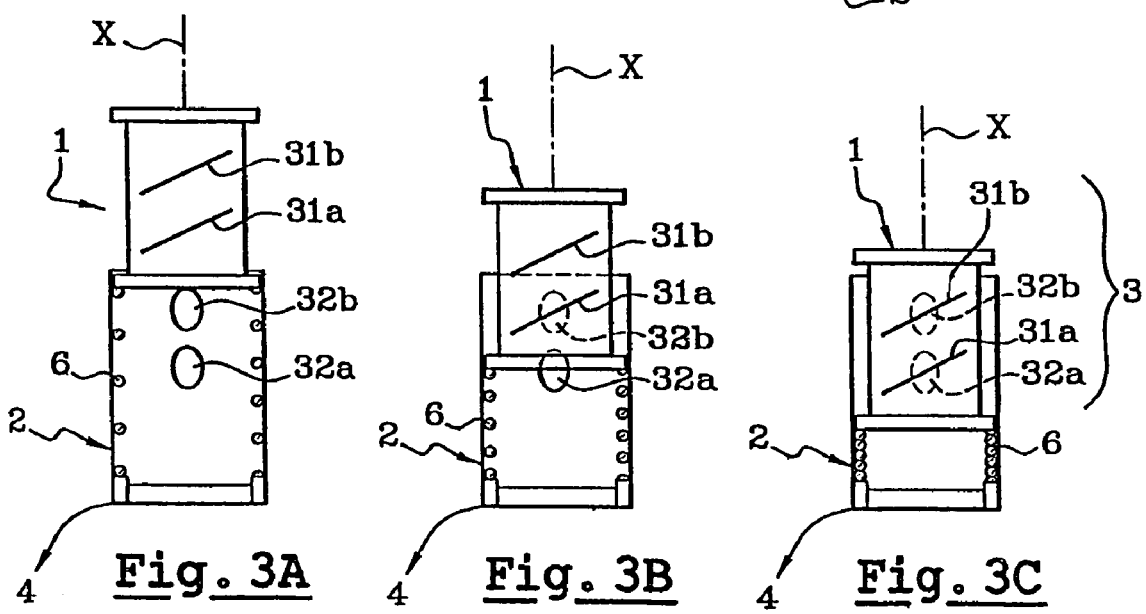
FIG. 3A is a schematic view representing a reader and an electronic label belonging to a device according to a first possible realization mode of the invention and being located in a distant relative position.
FIG. 3B is a similar view to that of the FIG. 3A, in which the reader and the electronic label are located in one of their two relative intermediate positions, which are a priori possible.
FIG. 3C is a similar view to that of the FIGS. 3A and 3B, in which the reader and the electronic label are located in their reference relative position.
Figure 4:
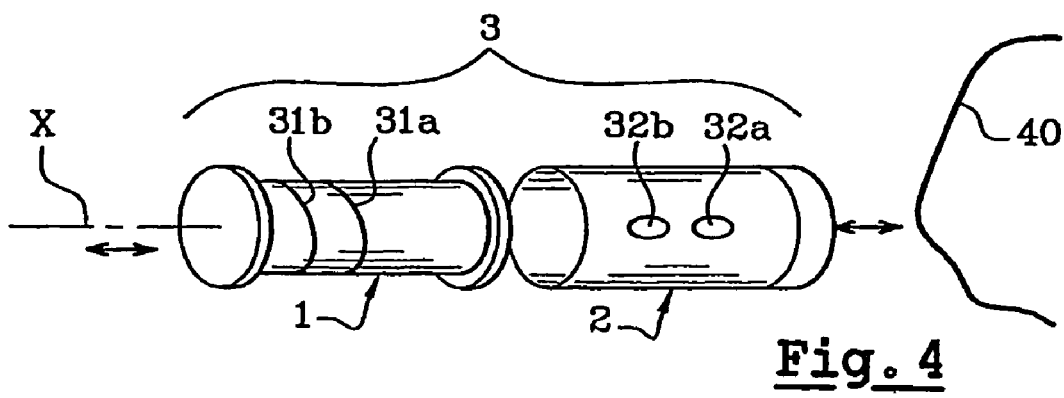
FIG. 4 is an exploded schematic view and a perspective view representing a reader and an electronic label belonging to a device in accordance with a second possible realization mode of the invention and designed to undergo a relative translation.
Figure 5:
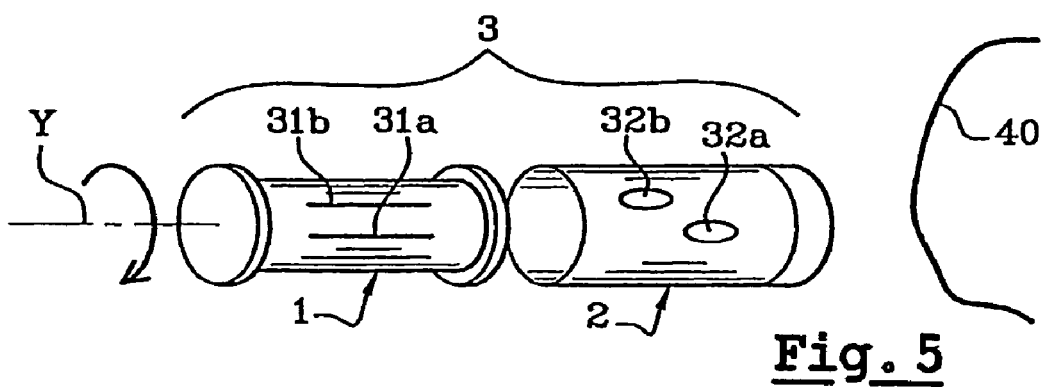
FIG. 5 is an exploded schematic view and a perspective view representing a reader and an electronic label belonging to a device in accordance with a further possible realisation mode of the invention and designed to undergo a relative rotation.

The magnetised tracks 31a and 31b are laid out in relation to the corresponding Hall effect sensors 32a and 32b for a reference relative position of the label 1 compared to the reader 2, shown in the FIG. 3C, and only for this position.

The Hall effect sensors 32a and 32b are connected to a electrical power supply circuit and pulse shaper 21, which produces the STAT status signal and provides it to the control circuit 23, this signal taking at least two different principal logical values, according to whether the label 1 is, or not, in its reference relative position compared to the reader 2.

In other words, whatever the number of bits being used to code the STAT status signal, the code representative of this signal start with a bit of strong weight equal to "1" or with "0" (or the reverse) according to whether the label 1 is, or not, in its reference relative position compared to the reader 2.

To increase the number of states likely to be discriminated the ones from the others the magnetised tracks 31a and 31b have preferably reversed polarities.

The FIGS. 3A to 3C represent in a simplified way a realisation mode in which the label 1 is physically guided compared to the reader 2 and can be pushed, along a translation axis X, up to its reference position towards the force exerted by a spring 6.

The FIG. 3A represents the label 1 in a distant position compared to the reader 2, i.e. in a position in which none of the Hall effect sensors 32a and 32b detects one of the magnetised tracks 31a and 31b and in which the aerials 10 and 20 are too much shifted apart, the one compared to the other, to allow a communication between the reader 2 and the label 1.

The FIG. 3B represents the label 1 in a position known as "intermediate" compared to the reader 2, i.e. in a position in which one of the Hall effect sensors 32a and 32b detects one of the magnetised tracks 31a and 31b, although the aerials 10 and 20 are still too much shifted apart, the one compared to the other, to allow a communication between the reader 2 and the label 1.

Two intermediate positions are a priori possible, namely the one in which the sensor 32b detects the magnetised track 31a (FIG. 3B) and the one in which the sensor 32a detects the magnetised track 31b, even if the relative movement of the label 1 compared to the reader 2 can be limited by stops to prohibit the label to reach for example the second intermediate position.

The STAT status signal produced by the electrical power supply circuit and pulse shaper 21 takes at least two different secondary logical values, according to whether the label 1 is, or not, in one of the intermediate relative positions.

In other words, whatever the number of bits being used to code the STAT status signal, the code representative of this signal comprises, after the bit of strong weight whose value indicates if the label 1 is, or not, in its reference relative position compared to the reader 2, a second bit whose value indicates if label 1 is, or not, in one of its intermediate relative positions.

If the label 1 is guided in translation movement compared to the reader 2 along a translation axis X and, as show in FIGS. 1 to 4, the magnetised tracks 31a and 31b are distant the one from the other along this translation axis X, as also are the Hall effect sensors 32a and 32b.

To make the detection via the Hall effect sensors 32a and 32b of magnetised tracks 31a and 31b more progressive, these tracks 31a and 31b are advantageously tilted compared to the translation axis X.

The label 1 and the reader 2 can assume a priori several forms.

In particular, label 1 can either take the form of a card (FIGS. 1 to 3C), in which case the reader 2 is at least partially flat, or a cylindrical form (FIGS. 4 and 5), in which case the reader 2 itself is at least partially cylindrical.

Moreover, instead of being guided in translation movement compared to reader 2, the label 1 can be guided in rotational movement compared to the reader 2 around an axis of rotation Y (FIG. 5), in which case the magnetised tracks 31a and 31b are angularly distant the one from the other by rotation around the rotation axis Y, as also are the Hall effect sensors 32a and 32b.

To avoid the necessity of supplying the aerial 20 in a permanent way, it can be convenient to provide that the communication circuit 22 is by default in a passive state, in which the aerial 20 is not supplied and that this communication circuit 22 is only moved to an active state, in which the aerial 20 is supplied, for certain relative positions of the label 1 compared to the reader 2.

For example, when label 1 moves from a distant relative position to an intermediate relative position, i.e. when the second strong weight bit of the STAT status signal transmitted to the control circuit 23 changes value, this control circuit 23 can make the communication circuit 22 moves from its passive state to its active state, this operating mode avoiding the permanent feeding of the aerial 20.

Figure 6:
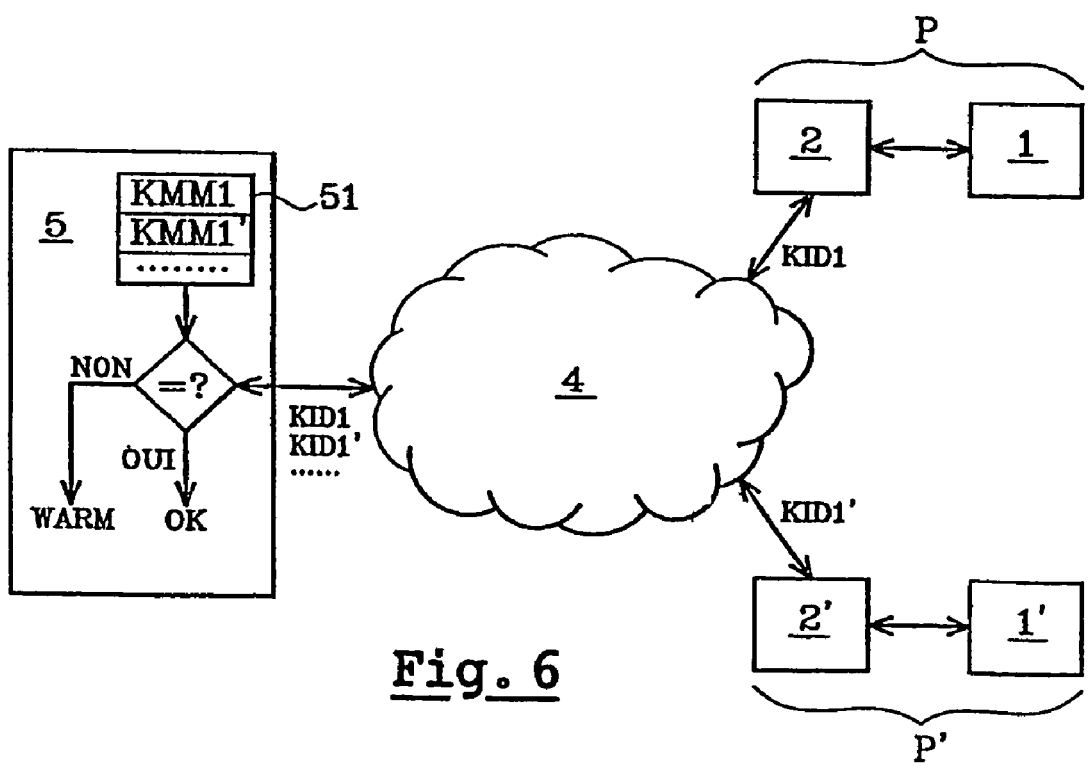
FIG. 6 is a schematic view representing a device according to the invention in its most accomplished form.

The invention device develops the its greatest number of advantages when it includes (FIG. 6) a communication network 4, for example formed by a bus 40 or including it, several pairs of interactive elements 15 such as P and P' connected to the network 4 and a polling circuit 5 itself connected to different pairs of interactive elements P and P' by means of the communication network 4.

Each pair of interactive elements, such as P and P', includes an electronic label, such as 1 and 1' and a tag reader, such as 2 and 2', the readers of the various pairs P and P' of the interactive elements being connected to the polling circuit 5 by the communication network 4 and all the labels of the various pairs P and P' of the interactive elements having different identification codes, such as KID1 and KID1'.

The control circuit 23 of each reader, such as 2 or 2', is for example programmed so as to transmit to the corresponding label 1 or 1', by means of the communication circuit 22, a transmission request of the identification code KID1 or KID' of this label 1 or 1', when the STAT status signal received by the control circuit 23 of this reader 2 or 2' indicates that this same reader, and the associated labels 1 or 1', are in their reference relative position, and only in this case.

If such is the case, the label 1 or 1' reads its identification code KID1 or KID1' in its memory 111 and retransmits it to the associated reader 2 or 2'.

The reader 2 or 2', in so far as it has acquired the identification code KID1 or KID' of the associated label 1 or 1', retransmits this code to the polling circuit 5 by means of the network display unit circuit and/or network interface circuit 24 of this reader and of the network 4.

The polling circuit 5, which communicates periodically with each reader such as 2 and 2', is able to receive the identification code conditionally emitted by each reader and to identify the origin of it.

This polling circuit 5 has a memory 51 in which reference codes such as KMM and KMM' are saved, each one of these codes being representative of the identification code that one of the readers, such as 2 or 2', is specifically supposed to emit and these reference codes being memorised in a given polling order of the various readers.

With the polling of each reader, such as 2 or 2', the polling circuit compares the identification code, such as KID1 or KID1', transmitted by this reader with the corresponding memorised reference code, KMM or KMM'.

If the identification code KID1 or KID1' is not provided by the polled reader, which means that this reader and the corresponding label are not in their reference position, or if the identification code KID1 or KID1' provided by the polled reader differs from the code KMM or KMM' which it should have produced, which means that an inversion has occurred between two labels, the polling circuit 5 produces a anomaly signal WARN, whose value preferably makes it possible to distinguish, the one from the other, these two types of anomaly.

If various identification codes, such as KID1 and KID1', are provided by the various polled readers and match with the respective reference codes memorised, such as KMM and KMM', the polling circuit 5 continues its normal operation and proceeds to a new polling phase.

The invention claimed is:
1. A control and/or monitoring device, comprising:
  at least a first pair of interactive elements including an electronic label and an electronic tag reader in mutual communication by respective radio aerials, the reader being operative to electro-magnetically feed the electronic label with electrical energy, the electronic label having a memory containing an identification code that is specific to the label and that the label selectively transmits to the reader; and a state encoder operative to produce a status signal representative of a logical or analogical state affecting the elements of the first pair of interactive elements, the state encoder including at least a permanent magnet carried by the electronic label and a magnetic field sensor carried by the reader.

2. The control and/or monitoring device according to claim 1, wherein the label is mobile compared to the reader, the status signal being representative of a relative position of the label compared to the reader.

3. The control and/or monitoring device according to claim 2, wherein the state encoder includes a pair of magnetized tracks distant from one another carried by the label and a pair of corresponding Hall effect sensors, carried by the reader, the magnetized tracks being laid out compared to the corresponding Hall effect sensors for a reference relative position of the label compared to the reader and only for this position and, the status signal taking at least two different principal logical values, according to whether the label is, or is not, in a reference relative position compared to the reader.

4. The control and/or monitoring device according to claim 3, wherein the tracks of the pair of magnetized tracks have reversed polarities.

5. The control and/or monitoring device according to claim 4, wherein the label is physically guidable, compared to the reader, between the reference relative position and a plurality of distant positions while passing by at least one of two intermediate relative positions, in each one of which only one magnetized track is detected by a Hall effect sensor, the status signal taking at least two different secondary logical values, according to whether the label is, or is not, in one of the intermediate relative positions.

6. The control and/or monitoring device according to claim 5, wherein the label is guidable in translation movement compared to the reader along a translation axis, the magnetized tracks being distant from one another along the translation axis.

7. The control and/or monitoring device according to claim 6, wherein the magnetized tracks are tilted relative to the translation axis.

8. The control and/or monitoring device according to claim 6, wherein the label is card and the reader is at least partially flat.

9. The control and/or monitoring device according to claim 6, wherein the label has a cylindrical form and the reader is at least partially cylindrical.

10. The control and/or monitoring device according to claim 5, wherein the label is guidable in rotation movement relative to the reader along a rotation axis, the magnetized tracks being angularly distant from one another by rotation around the rotation axis.

11. The control and/or monitoring device according to claim 3, wherein the reader includes a power supply circuit and a pulse shaper belonging to the state encoder and connected to the Hall effect sensors, and a communication circuit connected to the aerial of the reader.

12. The control and/or monitoring device according to claim 11, wherein the label is physically guidable, compared to the reader, between the reference relative position and a plurality of distant positions while passing by at least one of two intermediate relative positions, in each one of which only one magnetized track is detected by a Hall effect sensor, the status signal taking at least two different secondary logical values, according to whether the label is, or is not, in one of the intermediate relative positions, the communication circuit being operative to selectively adopt at least a passive state and an active state, the status signal making the communication circuit move from its passive state to its active state at the moment of passage of the corresponding label from a distant relative position to an intermediate relative position.

13. The control and/or monitoring device according to claim 1, including several pairs of interactive elements, each one of which pairs includes an electronic label and a tag reader, the readers of the various pairs of interactive elements being connected to a communication network, all the labels of the various pairs having different identification codes.

14. The control and/or monitoring device according to claim 13, and further comprising a polling circuit connected to the communication network and operative to communicate periodically with each reader, each reader being operative to read the identification code of the associated label as far as the reader and the associated label are in their reference relative position, each reader being operative to transmit to the polling circuit the identification code of the associated label as far as it was read, the polling circuit being operative to compare each identification code transmitted to it with a memorized reference code and produces a anomaly signal in the event of the absence of one of the codes to be compared or in case of disparity of the compared codes.

* * * * *